Dec. 17, 1957  G. V. WOODLING  2,816,781
DEEP THREAD RE-USABLE HOSE COUPLING
Filed Oct. 12, 1953
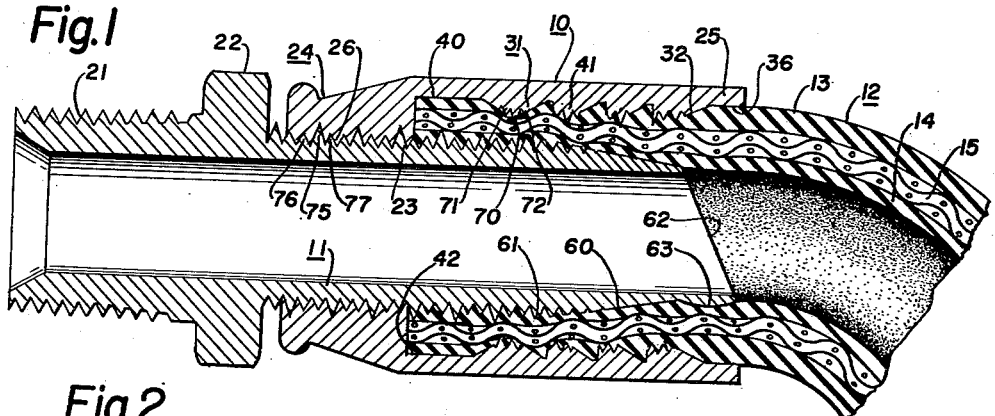
INVENTOR.
GEORGE V. WOODLING
BY
Woodling and Krost
attys United States Patent Office 2,816,781
Patented Dec. 17, 1957

2,816,781

DEEP THREAD RE-USABLE HOSE COUPLING

George V. Woodling, Cleveland, Ohio

Application October 12, 1953, Serial No. 385,322

14 Claims. (Cl. 285—149)

My invention relates in general to hose couplings and more particularly to hose couplings used for hydraulic or fluid circuits.

With the modern trends of using higher pressures in hydraulic circuits, there is a growing difficulty of manufacturing hose coupling which will resist blowing off under high pressure fluid shocks.

The hose preferably is of the reinforced type, and may comprise a single wire braid or a double wire braid for added strength. The reinforcing material is mounted between an outer and an inner layer of impervious resilient material which may be of synthetic rubber or other suitable composition. The hose may also comprise one or more rubber impregnated cotton braids. In the drawing, for simplicity, I have illustrated a hose having a single wire braid, but in actual practice a double wire braid may be used for added strength when operated under extremely high fluid pressures.

An object of my invention is to provide a coupling for connection to an end of a hose which will resist blowing off under high fluid pressure shocks.

Another object of my invention is to provide a coupling for connection to an end of a hose which engages the reinforcing material of the hose, but which does not require the skinning off or removal of the outer layer of the hose as required in previous inventions.

Another object of my invention is to provide a coupling for connection to an end of a hose which employs blade cutting threads to cut through the outer layer of the hose and engage the reinforcing material, and a tap for cutting same.

Another object of my invention is to provide a coupling for connection to the end of a hose which does not tend to unscrew when subjected to high fluid pressure shocks.

Another object of my invention is to provide a coupling for connection to an end of a hose which has major ridge means internally of the coupling for engaging the hose, the major ridge means being provided with minor ridge means in the form of screw threads having a small pitch with multiple pitch-lead to aid in screwing the coupling onto the hose, at least one of said multiple pitch-lead threads comprising blade cutting threads which cut through the outer layer of the hose and engage the reinforcing material.

Another object of my invention is to provide a coupling for connection to an end of a hose which has shoulder wall means to lock the coupling to the end of the hose.

Another object of my invention is to provide a coupling for connection to an end of a hose which does not require special tools or mandrels to assemble.

Other objects and a fuller understanding of my invention may be had by referring to the following description and claims taken in conjunction with the accompanying drawing, in which:

Figure 1 is a cross-sectional view of a hose coupling embodying the features of my invention, the view being substantially double scale for a hose having an outside diameter of 31/32 of an inch;

Figure 2 is an enlarged sectional view of the sleeve member of the coupling shown in Figure 1, the view substantially four times scale;

Figure 3 is a view of the sleeve of the coupling shown in its finished form;

Figure 4 is a view of an end of a hose ready to be mounted into the coupling;

Figure 5 is a cross-sectional view of the sleeve of the coupling member prior to providing the hose engaging female threads thereon; and Figure 6 is a partial view of a tap for cutting threads in the sleeve member.

With reference to the several views of the drawing, the hose coupling comprises generally a sleeve 10 and a stem 11, which are adapted to be connected to the end of a hose 12. As illustrated, the hose 12 has an outer layer 13, an inner layer 14 and a reinforcing layer of material 15. In the drawing, I have illustrated a double layer of reinforcing material 15 for giving added strength. The outer layer 13 and the inner layer 14 may comprise impervious resilient material for holding high fluid pressures. The impervious resilient material may comprise synthetic rubber and may be reinforced by layers of impregnated cotton or cloth braid. In the drawing, for simplicity, the impregnated cotton or cloth braid are not shown as being incorporated with the inner and uter layers.

The stem 11 is provided at its left-hand end with pipe threads 21 adapted for connection to a threaded port in a hydraulic system. The stem 11 is provided with a wrench hex pad 22, whereby the stem may be screwed into the sleeve 10. The outer surface of the stem 11 is provided with male threads 23.

The sleeve 10, for the purpose of description, has a first or left-hand end portion 24 and a second or right-hand end portion 25, which is open to admit the end portion of the hose 12 into the sleeve 10. The first or left-hand end portion of the sleeve 24 is provided with female threads 26 to threadably receive the male threads 23 on the stem. The male threads 23 on the stem and the female threads 26 in the sleeve are right-hand threads.

The internal surface of the sleeve which engages the end portion of the hose comprises an entrance flared mouth wall 32, into which the outer layer 13 of the hose is received and an anchoring sealing portion which is indicated by the reference character 31. As illustrated in the drawing, the flared mouth wall 32 is disposed at an angle of approximately 20 degrees with the longitudinal axis of the sleeve. In advance of the flared mouth wall 32 is a counter bore 36 to surround the outer surface of the hose.

The anchoring sealing portion, which is indicated generally by the reference character 31, comprises a first region 40 disposed adjacent the first or left-hand end portion 24 of the sleeve and a second region 41, which is disposed adjacent the first region and extends in a direction toward the second or right-hand end portion 25 of the sleeve. The first region 40 comprises a wide major groove 42 defining an annular chamber with a portion of the stem. The wide major groove 42, on its right-hand end terminates in a flared wall 43, which constitutes the junction between the first and second regions 40 and 41. The second region 41 comprises a plurality of major ridges 47 and a plurality of narrow major grooves 48 therebetween. The wide major groove 42 and the narrow major grooves 48 define an internal maximum diameter which is substantially the same diameter as the outer diameter of the outer layer 13 of the reinforced hose. The major ridges 47 in the present embodiment of the invention are annular ribs, and each rib comprises an inner annular portion 49 and an outer annular portion 50. The inner annular portions 49 have a minimum internal diameter and each has provided thereon minor ridge means in the form of hose engaging female threads to facilitate the insertion of the end portion of the hose into the sleeve. The hose engaging female threads are left-hand threads and are identified by a series of reference characters 52, 53, 54 and 55. The hose engaging female threads have a maximum root thread diameter less than the internal diameter of the narrow major grooves 48, with the result the construction provides an annular shoulder 51 between the maximum root thread diameter of the hose engaging female threads and the internal diameter of the narrow major grooves 48. As shown in Figure 2, the walls forming the annular shoulders 51 lean or recede to the left at an angle of about 5 degrees with the vertical in order to make for easier cutting with a recess tool, which is used to cut the grooves. The flared wall 43 which constitutes the junction between the first and second regions and which functions as a shoulder for the hose engaging female threads 55 is disposed at an angle of approximately 30 degrees in order to eliminate the use of an abrupt shoulder to engage the hose. The shoulder wall means which interlocks with the outside layer 13 of the reinforced hose includes as part thereof the flared wall 43 as well as the shoulders 51.

In actual practice, the hose engaging female threads are preferably made with a fine pitch, and may vary from sixteen-pitch threads up to twenty-four-pitch threads. The hose engaging female threads may be of a fine pitch because their function primarily is to aid in screwing the sleeve onto the end of the hose. Also, in order to provide a minimum number of turns to screw the sleeve onto the hose, I preferably employ hose engaging female threads which have a multiple pitch-lead thread. In the drawing, I show hose engaging female threads having a triple pitch-lead, but a different pitch-lead may also be employed. Thus, for example, if a twenty-pitch thread would be employed for the hose engaging female threads and with a triple pitch-lead, then substantially seven turns of the sleeve would advance the sleeve substantially one inch on the hose.

As shown in the drawing, one of the triple pitch-lead threads which is identified by the reference character 70 constitutes a higher thread than the other two side adjacent threads, which are identified by the reference characters 71 and 72. The side adjacent threads 71 and 72 are preferably standard threads, whereas the tall thread 70 is at least twice as tall as the standard threads 71 and 72, but with the same width base. The height of the tall thread 70 depends primarily on the thickness of the outer layer 13. The tall thread 70 may be characterized as a blade cutting thread which cuts through the outer layer 13 of the hose and directly engages the reinforcing material. A tap for cutting the threads is shown in Figure 6, in which 70A cuts the tall thread 70, and 71A and 72A cut the threads 71 and 72.

It is to be noted that the annular shoulders 51 constitute interlocking edges for engaging the hose and making a tight grip therewith. The flared wall 43, which constitutes the junction between the first and second regions 40 and 41, is made at an angle of substantially 30 degrees instead of a substantially straight shoulder as shown by the shoulders 51 in order to relieve the hose from being excessively or brutally gripped since the wide major groove 42 is wider than the narrow major grooves 48. Since the narrow major grooves 48 are relatively narrow, there is not too much opportunity for the hose to be excessively squeezed thereinto as there is with the end of the hose lying within the wide major groove 42. This is a reason why the flared wall 43 is not made at an abrupt angle such as the shoulders 51. The first or initial set of hose engaging female threads 52 at the first or right-hand end of the sleeve are preferably provided on the flared mouth wall 32 which extends at an angle of approximately 20 degrees with the longitudinal axis of the sleeve, so that the initial hose female engaging threads 52 facilitate the insertion of the hose thereinto. The remaining hose engaging female threads 53, 54 and 55 define substantially a straight bore.

The right-hand end or leading end of the stem 11 is provided with a taper 60, which constitutes a wedge. The taper 60 starts in the neighborhood where the lead line for the reference character 61 touches the stem, and is to the right of the last set of hose engaging female threads 55. The right-hand end 62 of the stem terminates at an angle other than a right-angle with the longitudinal axis thereof, thus forming a biased end, which makes it possible to insert the stem into the bore of the hose without using special tools or mandrels. As illustrated, the leading or right-hand end 62 of the stem terminates in an arcuate wall 63 which acts as a localized wiper to press the inside of the hose outwardly so that the outside of the hose is forced against the inner surface of the sleeve. Also, the arcuate wall 63 has a minimum area of contact which enables the stem 11 to be screwed into the sleeve and into the bore of the hose with a minimum of torque. Another advantage of the biased end 62 is that when it is turned at the proper degrees of rotation whereby the long side of the biased end is at the bottom of the sleeve, the hose may take its normal bend downwardly without interfering with the stem. In this manner, the arcuate wall 63 may extend to substantially the end of the sleeve and press the hose outwardly against the internal wall of the sleeve for its complete length and does not require any internal mandrel to press out the hose against the inside surface of the sleeve beyond the end of the stem.

The threads 23 are preferably a multiple pitch-lead thread. In the drawing, the threads 23 have a triple pitch-lead, but a different pitch-lead may be employed. One of the triple pitch lead threads which is identified by the reference characters 75 constitutes a higher thread than the other two side adjacent threads which are identified by the reference characters 76 and 77. The side adjacent threads 76 and 77 are preferably standard threads, whereas the tall thread 75 is at least twice as tall as the standard threads 76 and 77. The height of the tall thread 75 depends primarily on the thickness of the inner layer 14. The tall thread 75 may be characterized as a blade cutting thread which cuts through the inner layer 14 of the hose and directly engages the reinforcing material.

In assembly, the sleeve 10 is screwed or turned in a counterclockwise direction on to the end of the hose, since the hose engaging female threads are left-handed. The turning of the sleeve is arrested when the extreme left-hand end of the hose is slightly spaced from the inside surface of the end wall of the sleeve. In turning or screwing the sleeve on the end of the hose, the side adjacent threads 71 and 72 of the hose engaging female threads do not cut or dig into the outer surface of the hose very much, but the tall thread 70 cuts or digs into the outer surface of the hose and contacts the outer surface of the reinforcing material.

The stem 11 is next mounted into the sleeve with its leading biased end 62 thereof inserted into the bore of the hose. Since the leading end of the stem is biased, it can readily be inserted into the bore of the hose even though the bore of the hose is restricted as a result of being screwed into the sleeve. By the construction of the biased end of the stem, there is no need for special tools or mandrels to swell out the restricted bore of the hose prior to inserting the stem. The stem is turned or screwed in a clockwise direction into the sleeve and into the bore of the hose, since the threads are right-handed. The turning of the stem 11 into the sleeve tends to draw the hose tightly into the sleeve.

In turning or screwing the stem 11 into the end of the hose, the side adjacent threads 76 and 77 do not cut or dig into the inner surface of the hose very much, but the tall threads 75 cut or dig into the inner surface of the hose and contacts the inner surface of the reinforcing material. The reinforcing material is directly engaged on its outer surface by the tall threads 70 and directly engaged on its inner surface by the tall threads 75. Thus, this invention provides for directly engaging the reinforcing material without skinning off or removing the rubberlike layers. The invention also contemplates the use of a stem 11 which is of the standard thread design, thus eliminating the tall threads, as illustrated on the stem. With the stem having standard threads thereon, the assembly would be such that the reinforcing material is engaged only by the tall threads 70 on the inner surface of the sleeve 10.

The tapered section of the stem 11, as it is screwed into the hose, wedges or presses against the inside surface of the bore of the hose and forces the outside surface of the hose into the wide major groove 42 and into the narrow major grooves 48. The hose is forced outwardly beyond the depth of the hose engaging female threads and locks behind or against the shoulders 51 and the flared wall 43. In other words, the outer surface of the hose is pressed against the major ridge means and into the groove means for a distance defining a diameter greater than the maximum root thread diameter of the hose-engaging female threads.

The stem 11 as it is screwed into the hose also presses the outside surface of the reinforced material directly against the tall threads 70, whereby the reinforcing material is directly engaged by the sleeve 10 without skinning off or removing the outer layer 13 of the hose. The tall threads 75 on the stem also directly engage the reinforcing material which provides a direct engagement between the stem and the reinforcing material. The double engagement of the reinforcing material by the tall threads 70 and 75 provides a good strong connection for securely holding the hose within the sleeve 10.

The shoulders 51 and the flared wall 43, being annular, do not exert any influence which tends to cause the hose to become unscrewed from the sleeve incident to high pressure fluid peaks, as would be the case if the shoulders 51 and the flared wall 43 were helical. Thus, the invention of the major ridge means having minor screw threads therein prevents the hose from blowing off under high fluid pressure shocks. The stem 11 is screwed into the sleeve 10 until the wrench hex pad 22 is a small space from the sleeve, as illustrated in Figure 1 of the drawing. This small space provides room for further take-up of the stem after the hose has been in operation for a period of time.

As the stem is screwed into the bore of the hose, the arcuate wall 63 functions as a localized wiper to force the hose out against the inside surface of the sleeve for its entire length, thus avoiding the use of special tools or mandrels for this purpose. In practice, the hose is usually mounted so that it tends to loop downwardly and because of this, the rotation of the stem is preferably arrested when the long side of the biased end is at the bottom of the sleeve so that even though the stem extends out to the end of the sleeve, it does not interfere with the swinging movements of the hose and cause damage thereto.

The wrench hex pad 22 may be provided with a mark so that when the stem is screwed into the sleeve, the mark on the wrench hex pad 22 will indicate when the long side of the biased end of the stem is at the bottom of the sleeve. Preferably, the arcuate wall 63 is opposite the biased end of the stem; that is, it extends from the short side of the biased end to the long side thereof.

The flared wall 43 is shown as being smooth but may include one or more notches or ridges to bite the hose. The term "flared wall" includes both the smooth wall and the notches or ridged wall.

The sleeve 13 has a bore 31 adapted to surround the tube and comprises a continuous annular body 25 provided with rearwardly extending segmental fingers 26 which grip the tube when the nut 12 is tightened. The sleeve and stem are preferably constructed of steel capable of being quench hardenable throughout its entire mass and thereafter tempered or drawn back to a hardness value greater than that of the reinforcing material. I find that steel known as 4140, heat treated throughout its entire mass and tempered to a hardness value of approximately 30 to 50 Rockwell, is satisfactory for my sleeve and stem, the hardness value being preferably in the neighborhood of 38 to 42 Rockwell.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. In a coupling for engagement to an end portion of a reinforced hose having outer and inner layer means of impervious resilient material between which is mounted layer means of reinforcing material, said coupling comprising a sleeve to receive the end portion of the hose and a stem to fit into the end portion of the hose, said stem having an outer surface provided with threads and an inner surface defining a longitudinal bore, said sleeve having first and second end portions, said first end portion of the sleeve having threads to threadably engage the threads on the stem, said second end portion of the sleeve being open to admit the end portion of the hose into the sleeve, said sleeve having an internal surface to engage the end portion of the hose, said internal surface having first ridge means comprising axially spaced ridges and grooves engaging the outer layer means only of the hose and having second ridge means constituting female blade cutting thread means formed on the ridges of said first ridge means, said first ridge means having an axially extending internal annular face, said female blade cutting thread means having a base spirally disposed on said internal face of the first ridge means, said female thread means being tall with respect to said base and cutting through said outer layer means and engaging said reinforcing material, the outer surface of said stem constituting a wedge to wedgingly engage the inner surface of the end portion of the hose and press the outer surface of the outer layer means against the first ridge means and press the outer surface of the reinforcing material against the second ridge means.

2. In a coupling for engagement to an end portion of a reinforced hose having outer and inner layer means of impervious resilient material between which is mounted layer means of reinforcing material, said coupling comprising a sleeve to receive the end portion of the hose and a stem to fit into the end portion of the hose, said stem having an outer surface provided with threads and an inner surface defining a longitudinal bore, said sleeve having first and second end portions, said first end portion of the sleeve having threads to threadably engage the threads on the stem, said second end portion of the sleeve being open to admit the end portion of the hose into the sleeve, said sleeve having an internal surface to engage the end portion of the hose, said internal surface having first and second ridge means, said first ridge means comprising axially spaced ridges and grooves engaging the outer layer means only of the hose, said second ridge means constituting thread means having a multiple pitch-lead with at least one of the pitch-lead thread means being tall and with the other pitch-lead thread means being low, said second ridge means being formed on the ridges of said first ridge means, the major diameter of said second ridge means being less than the diameter of the grooves of said first ridge means, said tall pitch-lead thread means cutting through said outer layer means and engaging said reinforcing material, the outer surface of said stem constituting a wedge to wedgingly engage the inner surface of the end portion of the hose for pressing the outer surface of the outer layer means against the first ridge means and the low pitch-lead thread means and for pressing the outer surface of the reinforcing material against said tall pitch-lead thread means.

3. In a coupling for engagement to an end portion of a reinforced hose having outer and inner layer means of impervious resilient material between which is mounted layer means of reinforcing material, said coupling comprising a sleeve to receive the end portion of the hose, said sleeve having an internal surface to engage the end portion of the hose, said internal surface having thread means comprising a multiple pitch-lead with at least one of said pitch-lead thread means being tall and with the other pitch-lead thread means being low, said tall pitch-lead thread means having a height to cut through the outer layer means of the hose and directly engage the reinforcing material, said low pitch-lead thread means engaging only the outer layer means of the hose.

4. In a coupling for engagement to an end portion of a reinforced hose having outer and inner layer means of impervious resilient material between which is mounted layer means of reinforcing material, said coupling comprising a sleeve to receive the end portion of the hose, a stem for the coupling to fit into the end portion of the hose, said stem having an outer surface provided with thread means comprising a multiple pitch-lead with at least one of said pitch-lead thread means being tall and with the other pitch-lead thread means being low, said tall pitch-lead thread means having a height to cut through the inner layer means of the hose and directly engage the reinforcing material, said low pitch-lead thread means engaging only the inner layer means of the hose.

5. In a coupling for engagement to an end portion of a reinforced hose having outer and inner layer means of impervious resilient material between which is mounted layer means of reinforcing material, said coupling comprising a sleeve to receive the end portion of the hose and a stem to fit into the end portion of the hose, said stem having an outer surface provided with threads and an inner surface defining a longitudinal bore, said sleeve having first and second end portions, said first end portion of the sleeve having threads to threadably engage the threads on the stem, said second end portion of the sleeve being open to admit the end portion of the hose into the sleeve, said sleeve having an internal surface to engage the end portion of the hose, said internal surface having first ridge means engaging the outer layer means only of the hose and having second ridge means cutting through said outer layer means and engaging said reinforcing material, the outer surface of said stem constituting a wedge to wedgingly engage the inner surface of the end portion of the hose and press the outer surface of the outer layer means against the first ridge means and press the outer surface of the reinforcing material against the second ridge means, said threads on said stem comprising a multiple pitch-lead with at least one of said pitch-lead thread means being tall and with the other pitch-lead thread means being low, said tall pitch-lead thread means having a height to cut through the inner layer means of the hose and directly engage the reinforcing material, said low pitch-lead thread means engaging only the inner layer means of the hose.

6. In a coupling for engagement to an end portion of a reinforced hose having outer and inner layer means of impervious resilient material between which is mounted layer means of reinforcing material, said coupling comprising a sleeve to receive the end portion of the hose and a stem to fit into the end portion of the hose, said stem having an outer surface provided with threads and an inner surface defining a longitudinal bore, said sleeve having first and second end portions, said first end portion of the sleeve having threads to threadably engage the threads on the stem, said second end portion of the sleeve being open to admit the end portion of the hose into the sleeve, said sleeve having an internal surface to engage the end portion of the hose, said internal surface having first and second ridge means, said first ridge means engaging the outer layer means only of the hose, said second ridge means constituting thread means having a multiple pitch-lead with at least one of the pitch-lead thread means being tall and with the other pitch-lead thread means being low, said tall pitch-lead thread means cutting through said outer layer means and engaging said reinforcing material, the outer surface of said stem constituting a wedge to wedgingly engage the inner surface of the end portion of the hose for pressing the outer surface of the outer layer means against the first ridge means and the low pitch-lead thread means and for pressing the outer surface of the reinforcing material against said tall pitch-lead thread means, said threads on said stem comprising a multiple pitch-lead with at least one of said pitch-lead thread means being tall and with the other pitch-lead thread means being low, said tall pitch-lead thread means having a height to cut through the inner layer means of the hose and directly engage the reinforcing material, said low pitch-lead thread means engaging only the inner layer means of the hose.

7. In a coupling for engagement to an end portion of a reinforced hose having outer and inner layer means of impervious resilient material between which is mounted layer means of reinforcing material, said coupling comprising a sleeve to receive the end portion of the hose, said sleeve having an internal surface to engage the end portion of the hose, said internal surface having thread means comprising a multiple pitch-lead with at least one of said pitch-lead thread means being tall and with the other pitch-lead thread means being low, said tall pitch-lead thread means having a height to cut through the outer layer means of the hose and directly engage the reinforcing material, said low pitch-lead thread means engaging only the outer layer means of the hose, a stem for said sleeve, said stem having an outer surface provided with threads, said threads on said stem comprising a multiple pitch-lead with at least one of said pitch-lead thread means being tall and with the other pitch-lead thread means being low, said tall pitch-lead thread means having a height to cut through the inner layer means of the hose and directly engage the reinforcing material, said low pitch-lead thread means engaging only the inner layer means of the hose.

8. In a coupling for engagement to an end portion of a reinforced hose having outer layer means of resilient material beneath which is mounted layer means of reinforcing material, said coupling comprising a sleeve to receive the end portion of the hose, and a stem to fit into the end of the portion of the hose, said stem having an outer surface provided with threads and an inner surface defining a longitudinal bore, said sleeve having first and second end portions, said first end portion of the sleeve having threads to threadably engage the threads on the stem, said second end portion of the sleeve being open to admit the end portion of the hose into the sleeve, said sleeve having an internal surface to engage the end portion of the hose, said internal surface having first ridge means comprising axially spaced ridges and grooves engaging the outer layer means only of the hose and having second ridge means constituting female cutting thread means formed on the ridges of said first ridge means, said ridges having side shoulder wall means axially spaced apart from each other and defining sides of said grooves, said female thread means having a base spirally disposed on said ridges and extending in a spiral direction thereon between said side shoulder wall means for a spiral distance greater than the axial distance between said side shoulder wall means, said female thread means having a cross-sectional form different from that of said ridges, said female thread means having a thread pitch between adjacent teeth less than the axial extent between said shoulder wall means, said female thread means being tall with respect to said base and cutting through said outer layer means and engaging said reinforcing material.

the outer surface of said stem constituting a wedge to wedgingly engage the inner surface of the end portion of the hose and press the outer surface of the outer layer means against the first ridge means and press the outer surface of the reinforcing material against the second ridge means.

9. In a coupling for engagement to an end portion of a reinforced hose having outer layer means of resilient material beneath which is mounted layer means of reinforcing material, said coupling comprising a sleeve to receive the end portion of the hose, said sleeve having an internal surface to engage the end portion of the hose, said internal surface having first ridge means comprising axially spaced ridges and grooves engaging the outer layer means only of the hose and having second ridge means constituting female cutting thread means formed on the ridges of said first ridge means, said ridges having side shoulder wall means axially spaced apart from each other and defining sides of said grooves, said female thread means having a base spirally disposed on said ridges and extending in a spiral direction thereon between said side shoulder wall means for a spiral distance greater than the axial distance between said side shoulder wall means, said female thread means having a cross-sectional form different from that of said ridges, said female thread means having a thread pitch between adjacent teeth less than the axial extent between said shoulder wall means, said female thread means being tall with respect to said base and cutting through said outer layer means and engaging said reinforcing material.

10. In a coupling for engagement to an end portion of a reinforced hose having outer layer means of resilient material beneath which is mounted layer means of reinforcing material, said coupling comprising a sleeve to receive the end portion of the hose, said sleeve having an internal surface to engage the end portion of the hose, said internal surface having a plurality of thread means with at least one of said thread means being tall and with the other thread means being low, said tall thread means having a height to cut through the outer layer means of the hose and directly engage the reinforced material, said low thread means engaging only the outer layer means of the hose, said tall and low thread means having the same thread pitch and being axially spaced apart from each other for a distance of one thread pitch.

11. In a coupling for engagement to an end portion of a hose, said coupling comprising a sleeve to receive the end portion of the hose, said sleeve having an internal surface to engage the end portion of the hose, said internal surface having first ridge means comprising axially spaced ridges and grooves engaging the end portion of the hose and having second ridge means constituting female thread means formed on the ridges of said first ridge means, said ridges having side shoulder wall means axially spaced apart from each other and defining sides of said grooves, said female thread means having a constant pitch and having a base, a top and sides converging toward each other from said base to said top, said top having an axial extent less than said base, said base spirally disposed on said ridges and extending in a spiral direction thereon between said side shoulder wall means at an angle with respect to said ridges for a spiral distance greater than the axial distance between said side shoulder wall means, said female thread means having a thread pitch between adjacent teeth less than the axial extent between said shoulder wall means.

12. In a coupling for engagement to an end portion of a hose, said coupling comprising a sleeve to receive the end portion of the hose, said sleeve having an internal surface to engage the end portion of the hose, said internal surface having first ridge means comprising axially spaced ridges and grooves engaging the end portion of the hose and having second ridge means constituting female thread means formed on the ridges of said first ridge means, said ridges having side shoulder wall means axially spaced apart from each other and defining sides of said grooves, said female thread means comprising a multiple pitch-lead with each thread means having a base, a top and sides converging toward each other from said base to said top, said top having an axial extent less than said base, said base spirally disposed on said ridges and extending in a spiral direction thereon between said side shoulder wall means for a spiral distance greater than the axial distance between said side shoulder wall means, said female thread means having a thread pitch between adjacent teeth less than the axial extent between said shoulder wall means.

13. In a coupling for engagement to an end portion of a hose, said coupling comprising a sleeve to receive the end portion of the hose, said sleeve having an internal surface to engage the end portion of the hose, said internal surface having first ridge means comprising axially spaced ridges and grooves engaging the end portion of the hose and having second ridge means constituting female thread means formed on the ridges of said first ridge means, said ridges having side shoulder wall means axially spaced apart from each other and defining sides of said grooves, said female thread means having a constant pitch and having a base, a top and sides converging toward each other from said base to said top, said top having an axial extent less than said base, said base spirally disposed on said ridges and extending in a spiral direction thereon between said side shoulder wall means for a spiral distance greater than the axial distance between said side shoulder wall means, said female thread means having a thread pitch between adjacent teeth less than the axial extent between said shoulder wall means.

14. In a coupling for engagement to an end portion of a hose, said coupling comprising a sleeve to receive the end portion of the hose, said sleeve having an internal surface to engage the outer surface of the end portion of the hose, said internal surface having major ridge means defining a minimum internal diameter and major groove means defining a maximum internal diameter, said major ridge means having side shoulder wall means axially spaced apart from each other and defining sides of said major groove means, said major ridge means having minor ridge means provided thereon, said minor ridge means comprising hose engaging female thread means to facilitate the insertion of the end portion of the hose into the sleeve, said hose engaging female thread means having a maximum root thread diameter less than the maximum internal diameter of said major groove means, said female thread means having a constant pitch and having a base, a top and sides converging toward each other from said base to said top, said top having an axial extent less than said base, said base spirally disposed on said major ridge means and extending in a spiral direction thereon between said side shoulder wall means at an angle with respect to said major ridge means for a spiral distance greater than the axial distance between said side shoulder wall means, said female thread means having a thread pitch between adjacent teeth less than the axial extent between said shoulder wall means.

References Cited in the file of this patent

UNITED STATES PATENTS

| Re. 3,941 | Pierce | Apr. 26, 1954 |
| 410,698 | Rogers | Sept. 10, 1889 |
| 422,307 | Libbey | Feb. 25, 1890 |
| 793,824 | Culliney | July 4, 1905 |
| 2,302,675 | Cherry | Nov. 24, 1942 |
| 2,371,971 | Main et al. | Mar. 20, 1945 |
| 2,697,620 | Margrave | Dec. 21, 1954 |